United States Patent
Dudley

[15] 3,683,773
[45] Aug. 15, 1972

[54] STEREOSCOPIC PHOTOGRAPHY

[72] Inventor: Leslie Peter Dudley, Los Angeles, Calif.

[73] Assignee: Dudley Optical Laboratories, Inc., Beverly Hills, Calif.

[22] Filed: July 26, 1968

[21] Appl. No.: 747,931

[52] U.S. Cl. ...................................................95/18
[51] Int. Cl. .................................................G03b 35/08
[58] Field of Search ........................................95/18

[56] References Cited

UNITED STATES PATENTS

| | | |
|---|---|---|
| 3,387,547 | 6/1968 | Houghton.....................95/36 |
| 2,622,472 | 12/1952 | Bonnet....................95/18 P X |
| 2,950,644 | 8/1960 | Land.......................95/18 P X |
| 3,291,555 | 12/1966 | Browning................95/18 P X |
| 1,905,716 | 4/1933 | Ives............................95/18 P |
| 1,918,705 | 7/1933 | Ives............................95/18 P |
| 1,935,471 | 11/1933 | Kanolt.........................95/18 P |
| 2,063,985 | 12/1936 | Coffey.........................95/18 P |
| 2,724,312 | 11/1955 | Gruetzner..................95/18 P |

*Primary Examiner*—John M. Horan
*Attorney*—Jessup & Beecher

[57] ABSTRACT

Stereoscopic photographs, exhibiting the effect of parallax about both horizontal and vertical axes, are recorded on a lenticular film or a lenticular screen-film combination located at the focus of the camera objective, the lenticules on the film or screen having substantially spherical curvature and peripheries with a space-filling configuration, such as square or hexagonal, so oriented that there are no appreciable non-lenticulated areas between adjacent lenticules. Said configuration matches, to a reduced scale, that of an aperture in a plate or diaphragm located in the plane of one of the lens pupils. The characteristics of the lens, the aperture and the lenticles are so coordinated that the elementary image formed at the focus of each lenticule substantially fills the format of that lenticule so that adjacent elementary images are neither appreciable spaced apart nor overlapping. The completed photograph, or a reproduction thereof, exhibits a stereoscopic effect when viewed through the lenticulated surface or through another screen which matches that used in taking the picture. Also disclosed are methods and apparatus for manufacturing such lenticular film and screens, methods of copying the photographs, methods of recording and viewing stereoscopic color photographs on black-and-white stock, and the adaptation of the system to aerial photography and to television.

13 Claims, 42 Drawing Figures

PATENTED AUG 15 1972 3,683,773

INVENTOR.
LESLIE PETER DUDLEY
BY Lyon & Lyon
ATTORNEYS

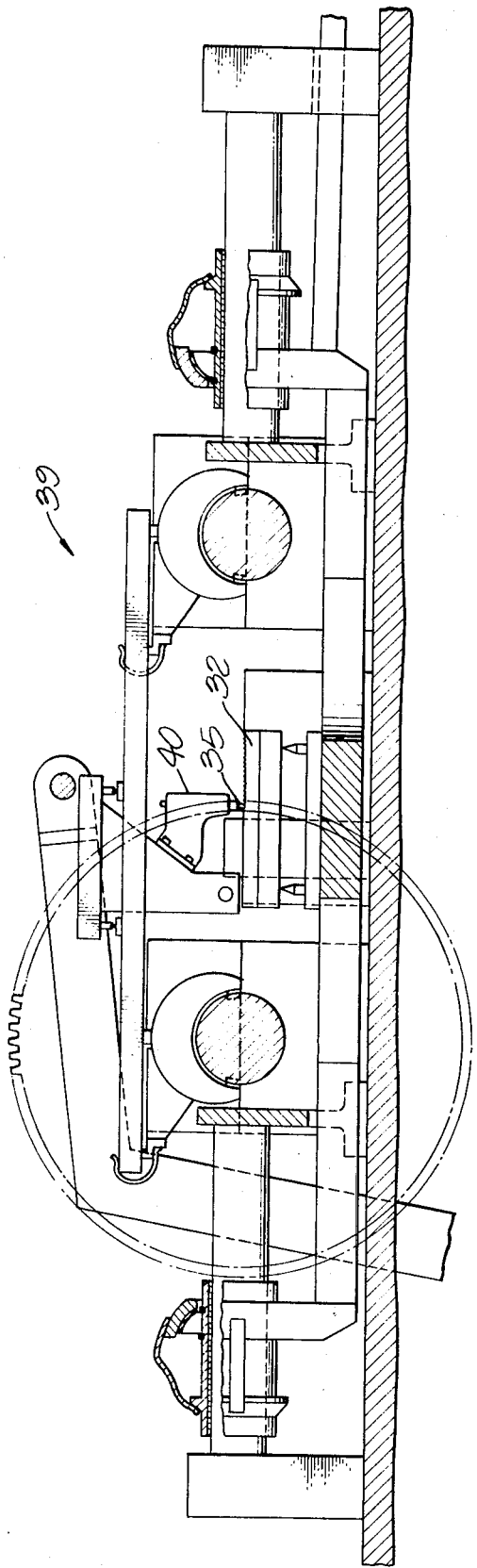

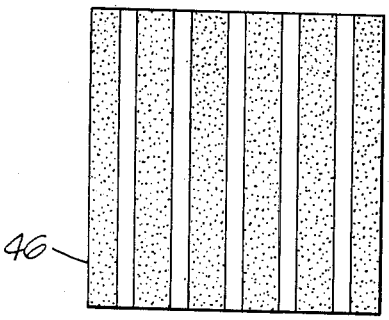
FIG. 10.
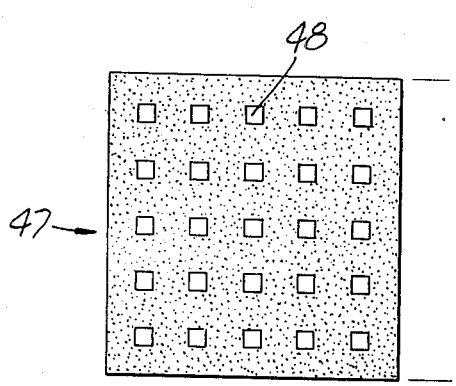 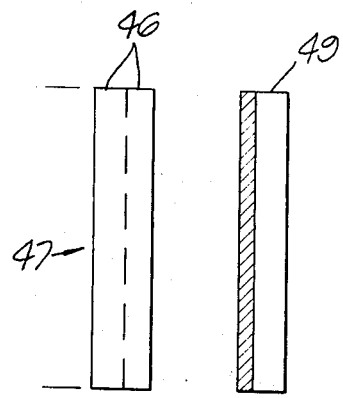
FIG. 11a.  FIG.11b.  FIG.11c.

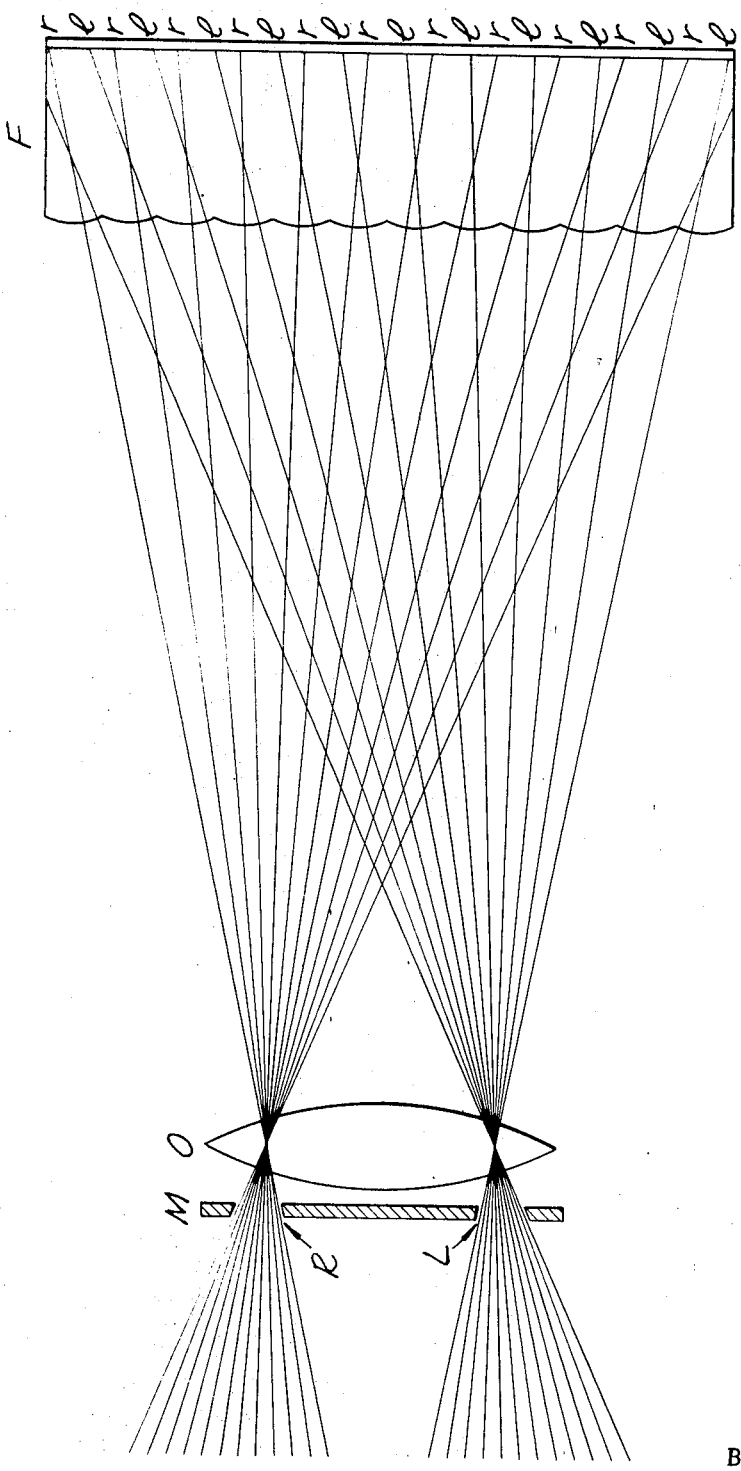

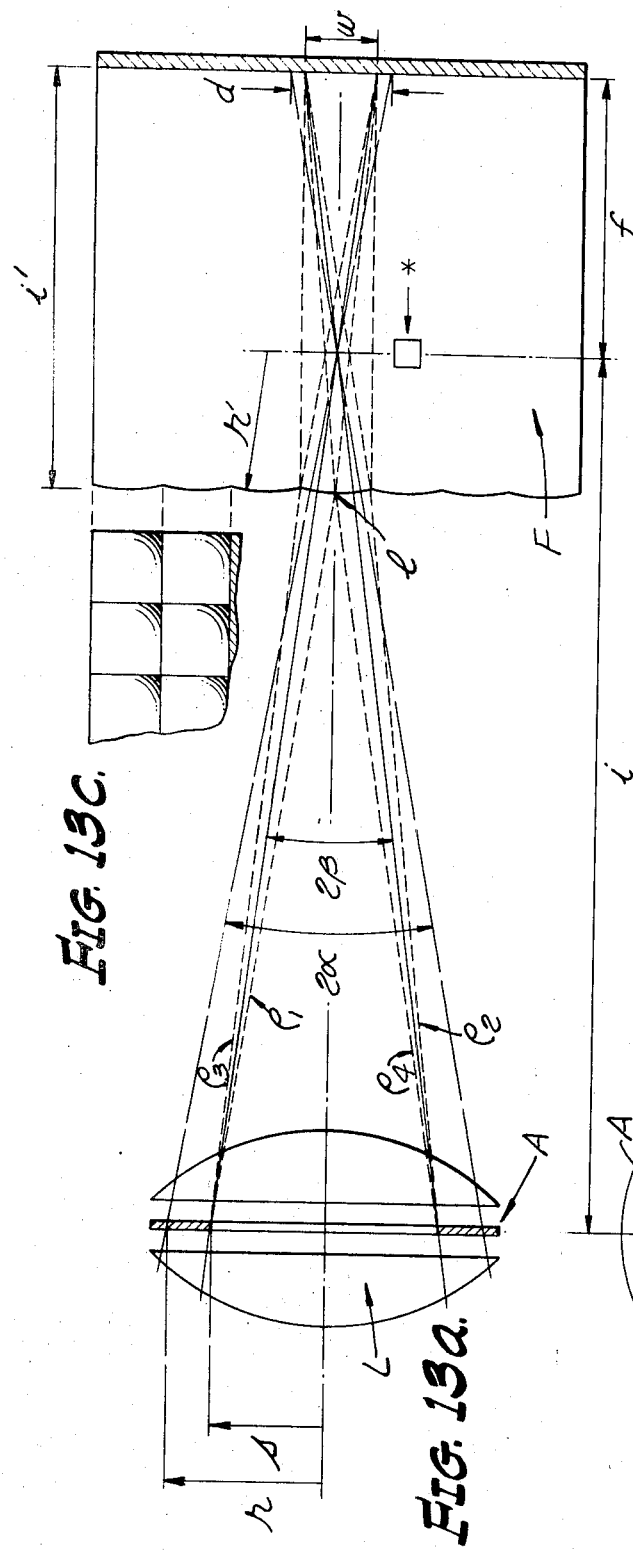
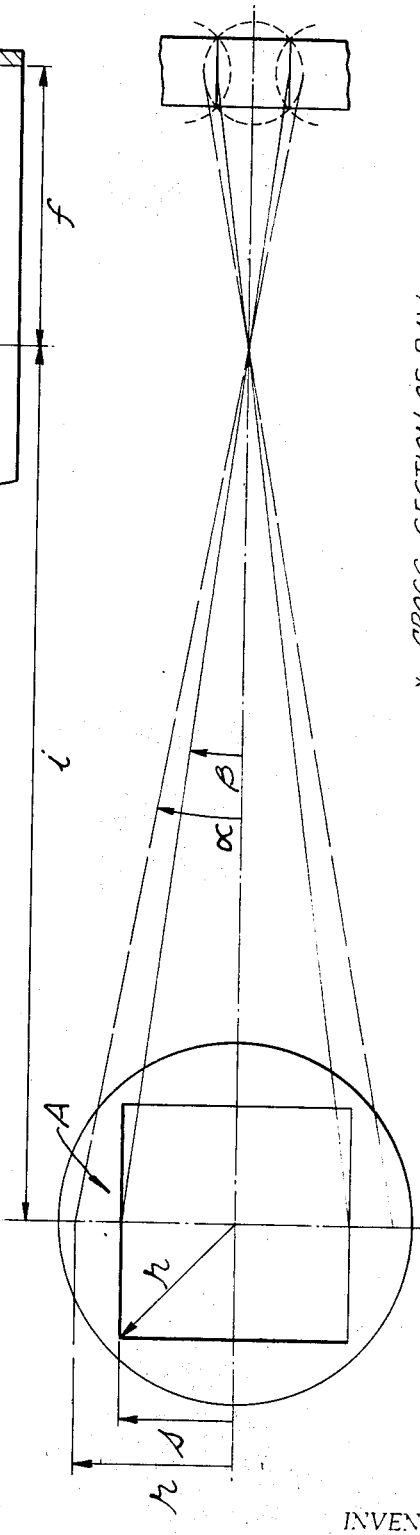

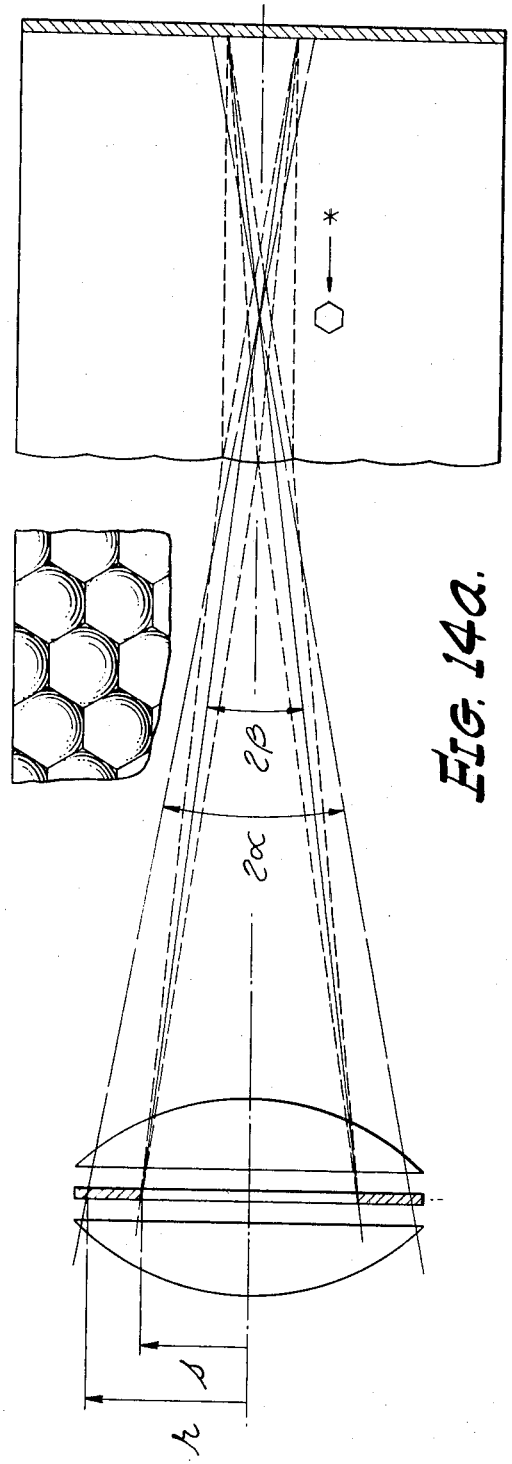
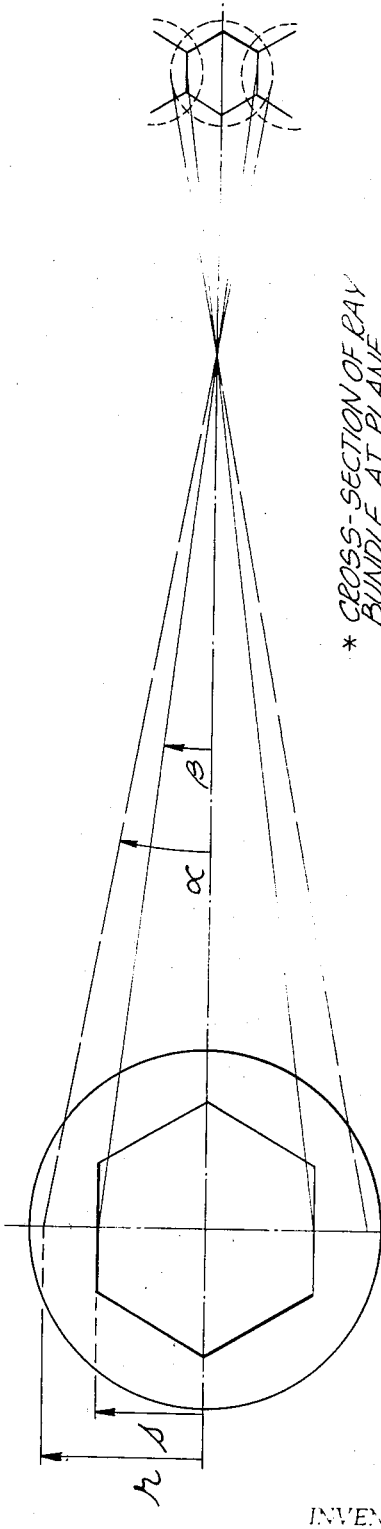
FIG. 14a.
FIG. 14b.
FIG. 14c.
* CROSS-SECTION OF RAY BUNDLE AT PLANE CONTAINING CENTER OF CURVATURE.

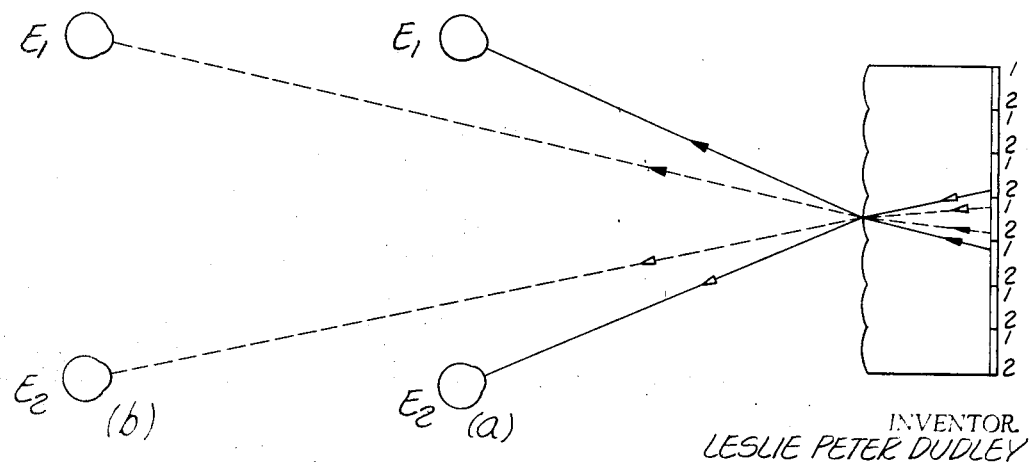

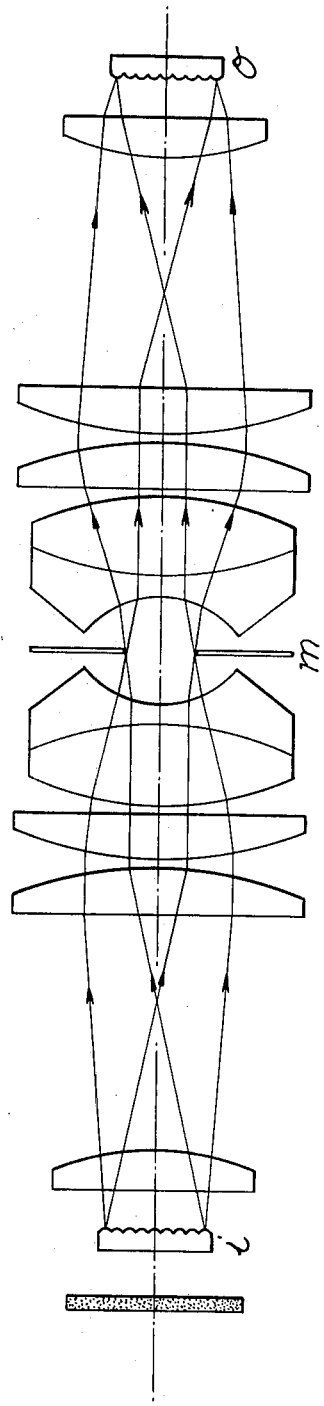
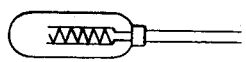
FIG. 20.
INVENTOR.
LESLIE PETER DUDLEY

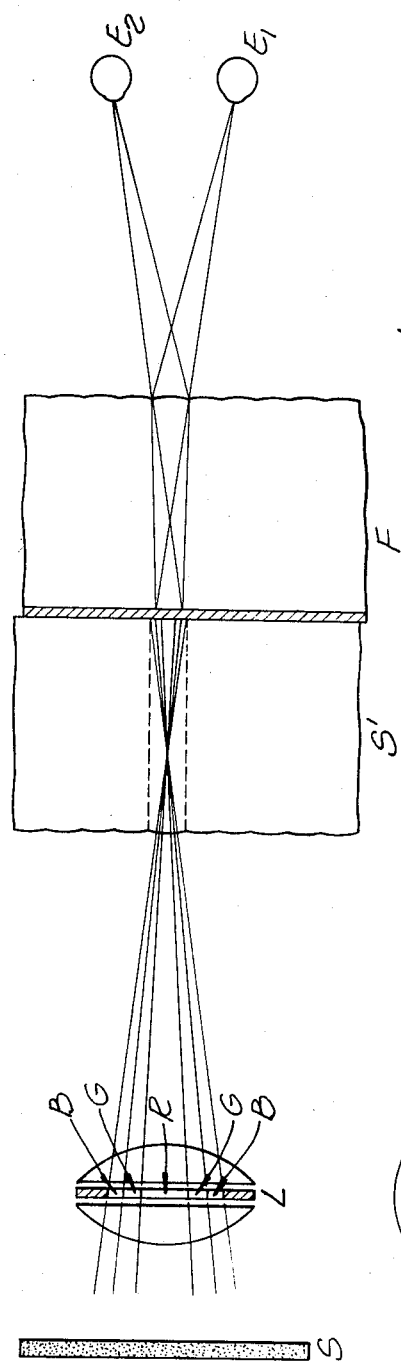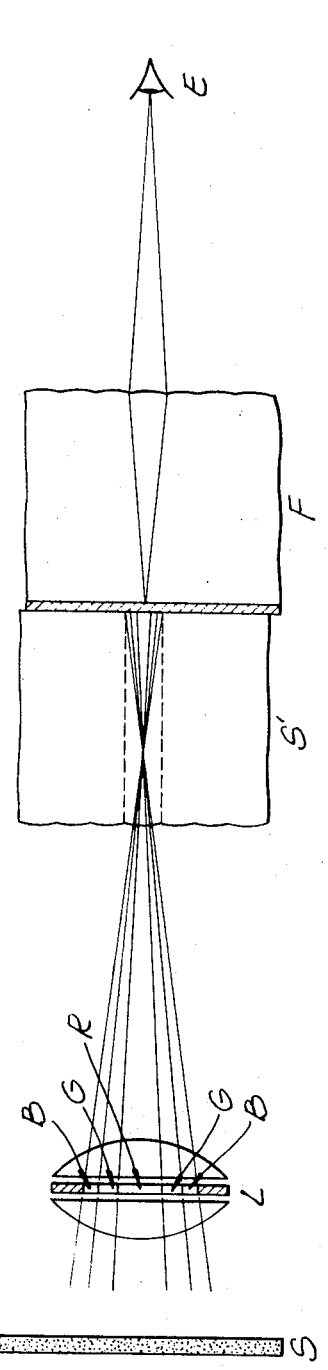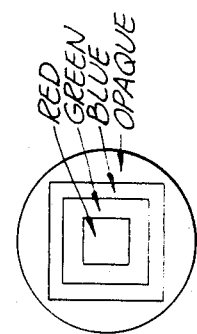

INVENTOR.
LESLIE PETER DUDLEY

STEREOSCOPIC PHOTOGRAPHY

The present invention is concerned with an improved system of stereoscopic or three-dimensional photography. A photograph produced in accordance with one or another of the methods described in this specification exhibits optical characteristics closely resembling those of a hologram. Thus, the aspect of the recorded three-dimensional image changes with change of viewpoint about both horizontal and vertical axes. However, the new type of photograph, which may be appropriately termed an "integram" or "integraph", possesses several important advantages over the hologram. For example, coherent light (e. g., laser illumination) is not required in either taking or viewing the picture. Further advantages are: The photographic equipment employed is compact and simple to operate; exposure times correspond to those which would be required for ordinary two-dimensional photography under the same conditions; action shots and/or the use of flash present no more difficulty than with ordinary photography, and it is virtually impossible to produce an out-of-focus picture.

The photographic record constituting an integram consists of a large number of minute, juxtaposed images produced by an optical screen or reseau. The same—or a similar—screen is used when viewing the picture. In the preferred form, the screen consists of transparent material embossed on one surface with an array of small lenticules or lenslets of spherical or substantially spherical curvature. The screen is so located with respect to the photographic film emulsion or other photo-recording medium that the photo-recording surface is at the focus of the lenticules. A convenient arrangement is for the screen-film combination to be manufactured as a composite unit, the lenticules being embossed on the exterior surface of the film base.

In some applications of the present invention it is possible to employ, instead of a screen embossed with spherical lenticules, a device which may be regarded as the optical equivalent of such a screen. One type of optically equivalent screen is made from a pair of cylindrically lenticulated screens, the lenticulated surfaces of the two screens being in contact with each other, and the longitudinal axes of the lenticules of one screen being at right-angles to the longitudinal axes of the lenticules of the other screen. Another type of optically equivalent screen consists, in effect, of a sheet of opaque material pierced with a multiplicity of small apertures disposed in a regular array. In this case the apertures are not circular, like a pinhole, but are so shaped that adjacent images in the corresponding array of images are not appreciable overlapping or spaced apart; thus, apertures of square shape are very suitable. A satisfactory square-aperture screen can be produced by "crossing" two line screens which have an appropriate opaque/transparent ratio; then, by correct adjustment of the distance between the array of apertures and the sensitive surface, matters can be so arranged that adjacent images in the array are not overlapping or spaced apart by an excessive amount. There are, basically, two alternative techniques either one or the other of which may be used for production of an integram; one of these techniques is termed direct integraphy, and the other is referred to as indirect integraphy. The present application is concerned with the indirect method, the direct method being described in my co-pending U. S. patent application filed of even date herewith, Ser. No. 747,996.

In the indirect method of this invention, the screen-film combination is used to record an integram of the aerial image of the scene or subject formed by a primary lens (e. g., camera objective). Thus, the screen-film combination can be located at the focal plane of a regular camera to which some slight modifications have been made; each lenticule then functions as a minute field lens, reimaging that portion of the image formed by the primary lens which would otherwise reach the film direct. In this indirect method, the degree of parallax is governed by the diameter of the primary lens. No focus adjustment is required for the purpose of ensuring sharpness, regardless of the distance of the subject, although the distance of the primary lens from the screen-film combination can be varied if desired. However, such adjustment has no effect on the sharpness of the imagery, but determines which particular transverse plane of the subject will appear to coincide with the film plane of the completed integram. The reimaging (by the lenticular array) process results in a tremendous increase in the depth of field that would otherwise be provided by the primary lens alone. The exposure can be varied by the use of a filter or filters and/or by adjustment of the shutter speed. The use of a primary lens of relatively large diameter is desirable, and a number of suitable (camera) lenses are currently available on the market. A significant consideration, moreover, is that lenses designed especially for indirect integraphy can be produced at costs substantially below those of equivalent lenses designed for regular photography. This is because the reimaging process renders it unnecessary to incorporate such precise correction for all the aberrations in the primary lens.

An important feature of the indirect method resides in the relationship which must exist between the characteristics of the primary lens, the characteristics of the lenticules, and the dimensions of a special type of aperture plate which is used in conjunction with the primary lens, no iris diaphragm being employed. The reason for this relationship is that it is necessary to ensure that adjacent images in the integraphic array are precisely abutting, and not appreciably overlapping or spaced apart.

It is preferred that the aperture plate consist of a mask of opaque material, the center portion of which is pierced to provide a clear aperture, square or hexagonal in shape, depending upon the characteristics of the lenticular array. In general, the $f$-number of the primary lens must be numerically lower than that of the lenticules. Then, by appropriate selection of the size of the aperture, the condition specified in the preceding paragraph can be fulfilled.

If desired, the camera can be provided with an adjustable aperture plate so that, either manually or automatically, the size of the opening can be varied according to the distance of the plane on which the camera is focused.

Integrams produced by the indirect method present a predominance of stereoscopic zones when viewed from a comparatively short distance, such as that customarily adopted in normal reading. At greater viewing distances, pseudoscopic zones predominate. This state of affairs can be reversed, if desired, by adopting a suitable printing technique when making the positive; the picture will then appear predominantly pseudoscopic when viewed from a short distance, and predominantly stereoscopic when viewed from a greater distance.

It is sometimes desirable to be able to increase the horizontal parallax (stereoscopic base) to a degree beyond that equivalent to the diameter of the camera lens. Such occasions arise when, for example, it is necessary to photograph a distant landscape in which there are no objects in the immediate foreground, or when aerial photography is involved. To meet occasions in the former category, a special lightweight, mechanically operated, traversing-type camera-mounting can be employed. Exposure is made via a horizontally operating, focal-plane shutter while the camera shifts laterally through a predetermined distance. The stereoscopic base can be increased by this means by an amount equal to several times the interocular separation. The three-dimensional effect exhibited by the resulting integram will be either predominantly stereoscopic or predominantly pseudoscopic depending upon whether the photo-recording device and the shutter slit are caused to move in opposite directions or the same direction. A miniaturized version of the camera-mounting described in my U. S. Pat. No. 2,572,994 (corresponding to British Pat. No. 656,165) could be adapted to the present purpose, but a less complex device may be employed, if desired.

In the case of aerial photography, the special mounting referred to above is not required, the increase in stereoscopic base being provided by the forward motion of the aircraft. The camera is equipped with a focal plane shutter operating in a direction parallel to the flight axis. The shutter is set so that the slit traverses the film format during the time taken by the aircraft to fly a predetermined distance.

A further feature of the invention resides in the provision of an optical method of enhancing the stereoscopic base, no lateral movement of the camera being required. This method is particularly useful when integrams are to be recorded in image formats of small dimensions, such as those associated with miniature cameras, television camera tubes, etc., as it is difficult to design and manufacture lenses which possess both large diameter and short focal length. The method involves the use of an additional optical system located in front of the camera lens. This optical system consists of a photographic lens, both the diameter and focal length of which are greater than those of the camera lens, together with an associated field lens. In effect, the relatively large aerial image formed by the first lens becomes the object insofar as the camera lens is concerned; the camera lens reimages that object to a reduced scale at its focal plane.

It is to be understood that the scope of this invention is not restricted to the recording of images on regular photographic emulsions or on the phosphor of television camera tubes; the image-recording, image-receiving or image-reproducing medium may be of any desired nature. Likewise, the invention may be applied to either still photography or motion pictures.

In the drawings:

FIG. 7 is a side elevation, partly in section, showing the reciprocating tool-holder in position on a typical ruling engine.

FIG. 10 is an enlargement of a portion of a line screen.

FIG. 11a shows a front elevation of a composite screen formed by crossing at right-angles two line screens of the type shown in FIG. 10.

FIG. 11b is a side elevation of the device of FIG. 11a.

FIG. 11c shows a photographic plate located behind the composite screen.

FIG. 12 is a diagram showing a portion of a spherically lenticulated film placed at the focus of a camera lens, together with a mask having twin apertures.

FIG. 13a is a diagram, partly in section, showing a portion of a spherically lenticulated film placed at the focus of a camera lens provided with a square aperture.

FIG. 13b is a diagram corresponding to FIG. 13a, the lens and aperture being viewed on axis.

FIG. 13c is a front view of the lenticular surface, partly broken away, showing the square peripheries of the lenticules.

FIGS. 14a, 14b and 14c are similar, respectively, to FIGS. 13a, 13b and 13c, except that the lens aperture and the lenticules have hexagonal peripheries.

FIGS. 15a through 15f relate to characteristic features peculiar to optical imaging processes involving the use of spherically lenticulated screens or film.

FIG. 16 is a diagram illustrating the effect of the twofold image-inversion resulting from the joint action of the primary lens and the spherical lenticules.

Figure 17:
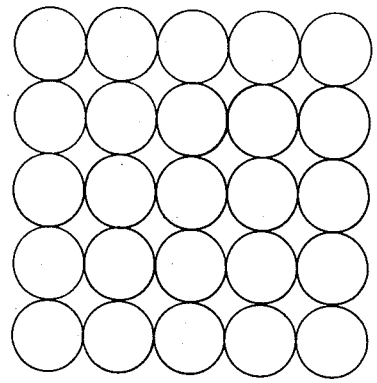

FIG. 17 is a diagram showing lenticules with circular peripheries arranged in square array.

Figure 18:
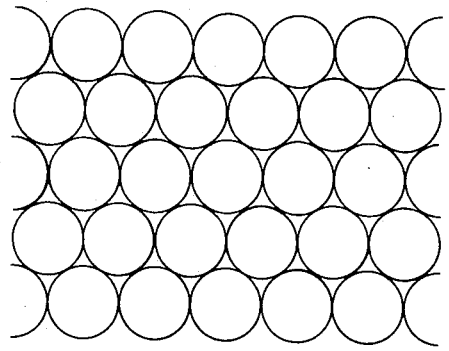

FIG. 18 is a diagram showing lenticules with circular peripheries arranged in honeycomb array.

Figure 19:
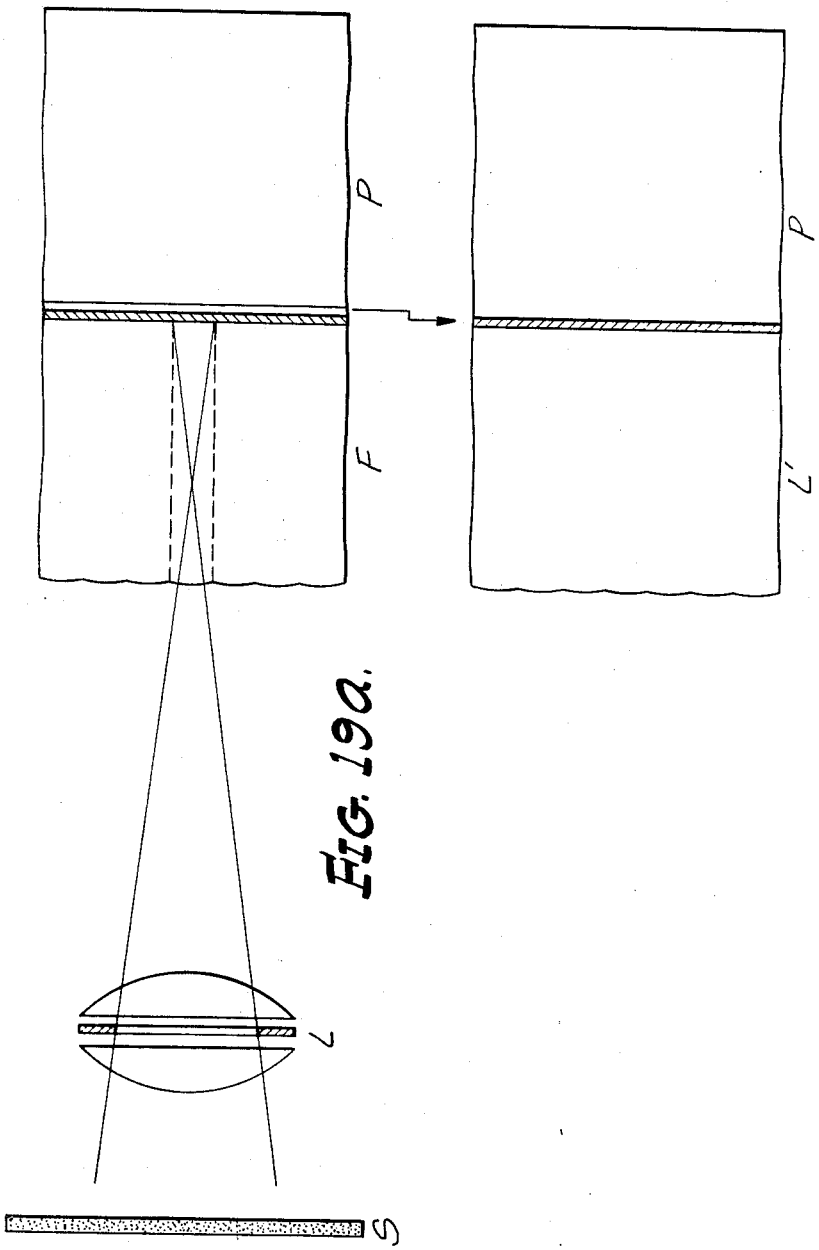

FIG. 19a is a diagram showing a method of making contact prints.

FIG. 19b shows a lenticular screen laminated to the emulsion surface of the print.

FIG. 20 is a diagram showing a method of making prints, at unit magnification, in the form of transparencies.

FIG. 21 shows a modified form of aperture plate, embodying color filters.

FIG. 22 is a diagram showing a side elevation of an arrangement for viewing a transparency both stereoscopically and in natural color.

FIG. 23 is a plan view of the arrangement shown in FIG. 22.

Figure 24:
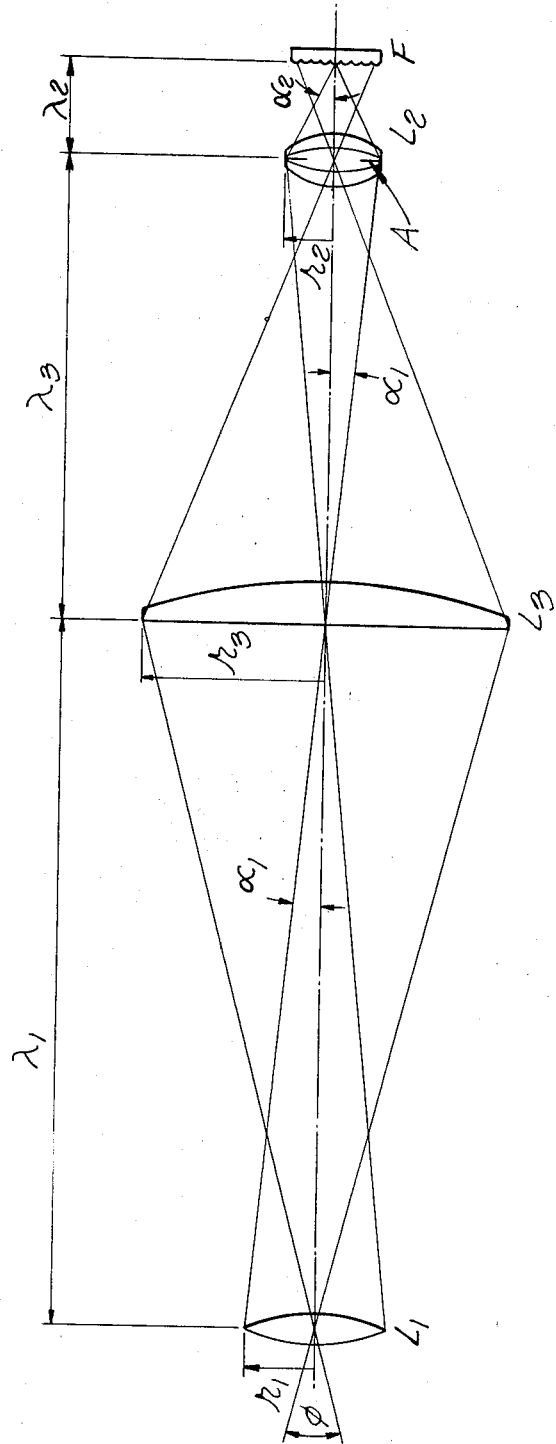

FIG. 24 is a diagram showing the adaptation of the stereo photographic system for use with image formats of small dimensions.

Figure 25:
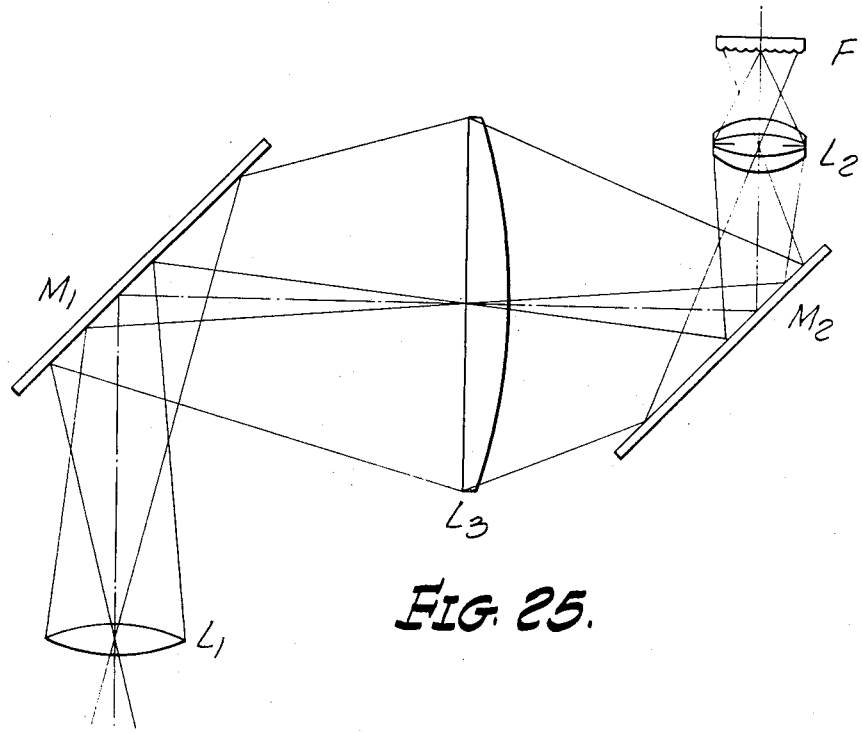

FIG. 25 is a diagram showing the use of folded optics to produce an equivalent, but more compact, form of the arrangement shown in FIG. 24.

Figure 26:
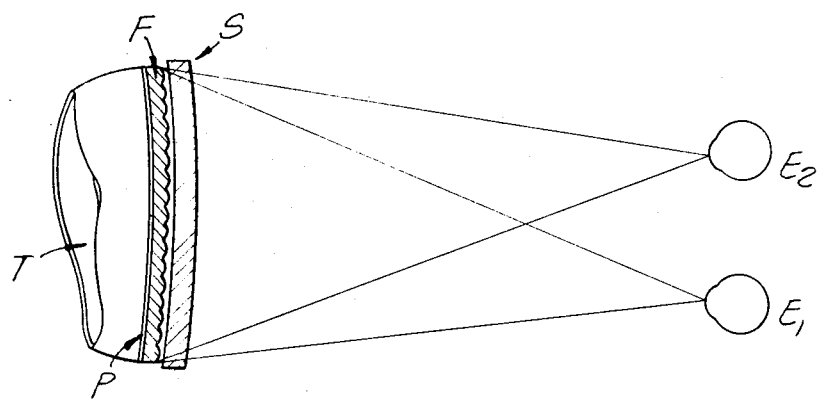

FIG. 26 is a schematic diagram showing a feature of this invention applied to a television picture tube.

OPTICAL PROPERTIES OF THE LENTICULES.

Figure 1:
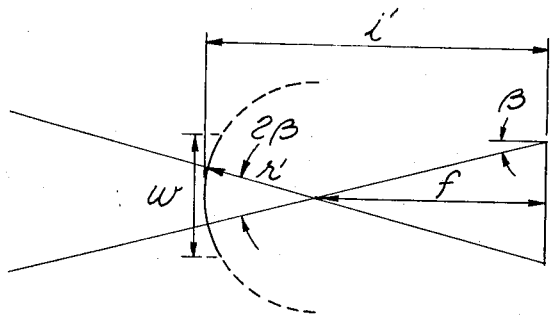
FIG. 1 is a diagram used in deriving the optical properties of an individual lenticule.

Referring to FIG. 1, the distance $i'$ of the focal plane from the summit of a lenticule is related to the radius of curvature $r'$ by the expression:

$$\mu/i' = (\mu-1)(1/r') \quad (1)$$

where $\mu$ denotes the refractive index of the screen material. The value of $\mu$ is usually in the region of 1.5, so, as a close approximation, we have:

$$1.5/i' = 0.5/r'$$

or $$i' = 3r' \quad (2)$$

The focal length $f$ is measured from the center of curvature, and hence:

$$f = 2r' = 2i'/3 \quad (3)$$

The maximum possible aperture is obtained when the width $w$ of the entrance surface is that of a complete hemisphere, in the case of a spherical lenticule, or a complete semicylinder, in the case of a cylindrical lenticule. Then:

$$f\text{-number} = f/w = 2r'/2r' = f/1.0 \quad (4)$$

The acceptance angle $2\beta$ is determined as follows:

$$\tan \beta = w/2f$$

$$\beta = \tan^{-1}(w/2f$$

and $$2\beta = 2\tan^{-1}(w/2f \quad (5)$$

The maximum possible acceptance angle is obtained when the lenticules have an aperture of $f/1.0$, in which case we have:

$$w = f$$

so that $$2\beta = 2\tan^{-1} 0.5000 = 53°08'$$

The interdependence of the various screen parameters will be apparent from the foregoing. The effects of this interdependence on the design of lenticular film suitable for use in connection with the present invention will become apparent later in the specification.

NATURE OF THE LENTICULAR ARRAY, AND METHOD OF MANUFACTURE

Figure 2A:
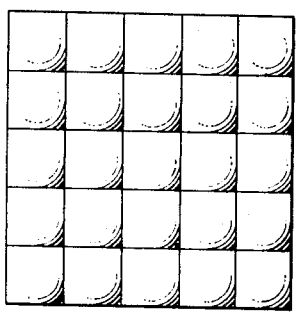
FIG. 2a is a front view of a piece of spherically lenticulated film, shown greatly enlarged.

FIG. 2a depicts, greatly enlarged for the sake of clarity, a portion of spherically lenticulated film (or screen-film combination) suitable for use in connection with the invention. In this illustration the lenticules have square peripheries and are arranged in square array. However, these are not essential requirements; the essential requirement is that there shall be no non-lenticulated areas between adjacent lenticules. (Thus, for example, it is possible to use lenticules having hexagonal peripheries, arranged in honeycomb array. This type of arrangement will be discussed later.)

The matrix or die used to form the lenticules may be manufactured by one or another of a number of different methods. For example, the necessary multiplicity of spherically curved concavities may be formed in the surface of a metal cylinder or flat plate by drilling. Another proposed method is to employ a machine which combines, in effect, the $x$ and $y$ movements of a ruling engine (such as that used in the production of line screens and half-tone screens) with a reciprocating motion in the $z$ dimension similar to the motion of the needle in a sewing machine. Thus, the area in which the concavities are to be formed is scanned, about both $x$ and $y$ axes, by appropriate setting of the movements of the ruling engine. The requisite number of concave indentations is formed in that area by embossing; the embossing operation is performed by a convex-faced tool carried in a tool-holder which reciprocates in the $z$ dimension at a frequency which is appropriately coordinated with the $x$ and $y$ scanning motions.

Figure 3:
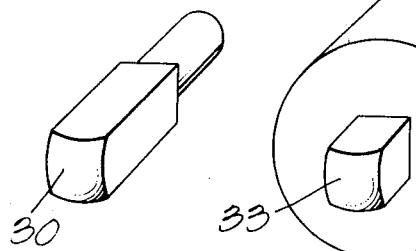
FIG. 3 is a perspective view showing a forming tool for production of spherically curved concavities in the working surface of the die.
Figures 4, 5:
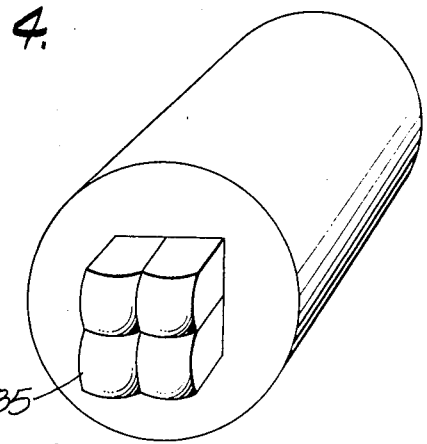
FIG. 4 is a similar view showing such a tool embedded in a metal rod to increase rigidity.
FIG. 5 is a view similar to FIG. 4, showing a tool having multiple forming elements.
Figure 6A:
FIG. 6a is a front elevation showing a portion of a completed die.
Figure 6B:
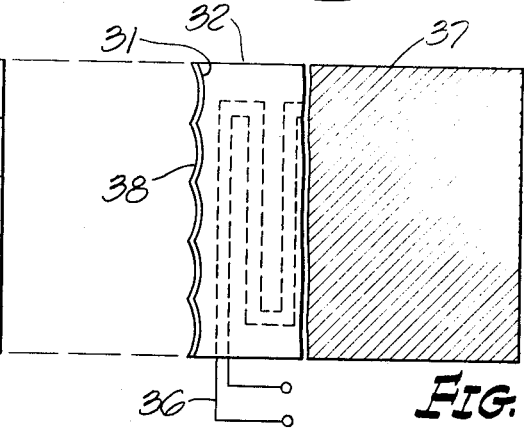
FIG. 6b is a side elevation thereof, partly in section and partly broken away.

Referring to the drawings, FIG. 3 represents a single forming-tool 30 of a type suitable for production of the spherically curved concavities 31 in the working surface of the die 32 shown in FIGS. 6A and 6B. FIG. 4 shows a forming-tool 33 of the same type embedded in a metal rod 34 of larger diameter in order to increase its rigidity and facilitate mounting of the tool in the tool-holder of the embossing machine. FIG. 5 shows a cluster 35 of forming-tools of the type shown in FIGS. 13 and 4, the object of this arrangement being to reduce the number of strokes that must be made by the embossing machine in producing a die of given size. FIGS. 6a and 6b represent a portion of the completed die 32. The die illustrated is assumed to be made of a material, such as a thermosetting plastic, which is capable of being softened slightly by the heating effect of an electrical current in circuit 36 in order to minimize tool wear during the embossing operation. After completion of the embossing operation, the die 32 is permitted to cool and reharden, and then mounted on a metal backing plate 37 to increase its rigidity. The backing plate may be curved (e. g., cylindrical) or flat, depending upon the type of process to be employed in manufacturing the lenticular film or screen. After mounting of the die 32 on the backing plate, the working surface is metallized (e. g., by electrodeposition) as shown at 38 in order to increase its hardness. FIG. 7 shows a portion of a typical ruling engine 39 adapted to perform the embossing operation, and having the formingtool 33 mounted in the tool-holder 40 and acting on the die 32. This particular ruling engine 39 is disclosed in U.S. Pat. No. 2,575,367, but this is by way of illustration only.

Figure 2B:
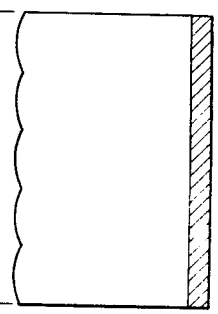
FIG. 2b is a side elevation thereof.
Figure 9A:
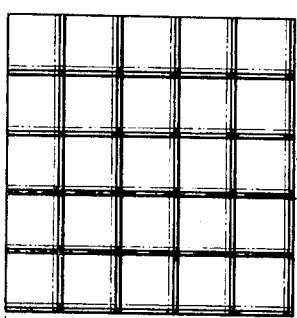
FIG. 9a is a front elevation of a composite screen of the type shown in FIG. 8, in contact with a photographic plate.
Figure 9B:
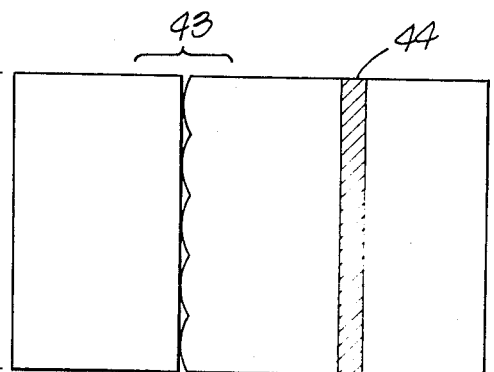
FIG. 9b is a side elevation thereof.
Figure 9C:
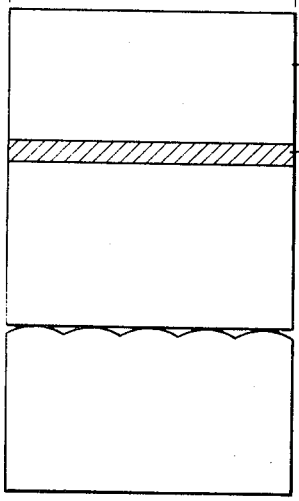
FIG. 9c is a top plan view thereof.
Figure 8:
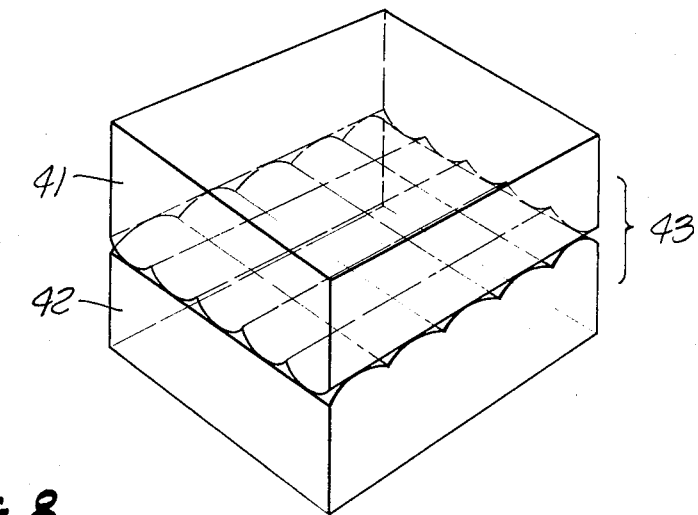
FIG. 8 is a perspective view in diagrammatic form showing a pair of cylindrically lenticulated screens crossed at right-angles.

As previously indicated, it is possible to simulate the effect of an array of spherical lenticules with square peripheries by the use of a pair of cylindrically lenticulated screens 41 and 42 (FIG. 8), crossed at right-angles. In FIGS. 9a, 9b and 9c this composite screen 43 is shown placed in contact with the sensitive surface 44 of a photographic plate 45 or other suitable photorecording medium to produce the photographic equivalent of the arrangement shown in FIG. 2a. A further optically equivalent arrangement is obtainable by the use of a pair of line screens 46, having a relatively high opaque/transparent ratio, of the type shown, again greatly enlarged, in FIG. 10. A pair of such screens, when crossed at right-angles, results in a composite screen 47 having a multiplicity of minute square apertures or "pinholes" as represented at 48 in FIG. 11a. In FIG. 11b, the composite screen 47 is shown, in side elevation, located in front of a photographic plate 49, FIG. 11c. Although this arrangement is basically similar to that represented in FIGS. 2a and 2b, it is to be realized that (a) the arrangement shown in these earlier diagrams is inevitably faster in the photographic sense due to the fact that the f-number of the lenticules is smaller than that of the square apertures, and (b) the resolution of the arrangement in FIGS. 11a to 11c is inevitably much lower due to the fact that a substantial portion of the imagery transmitted by camera lens is obstructed by the opaque areas between the apertures.

FUNDAMENTAL CONCEPTS

Referring to FIG. 12, this diagram is intended for use in explanation of certain optical characteristics of the invention, although the actual combination of elements illustrated does not represent a feature of the invention. The diagram shows a piece of spherically lenticulated film F placed at the focus of a camera lens O. The lens is assumed to have a large effective diameter, preferably greater than the normal interocular distance of about 2½ inches. An opaque mask M is located close to the lens, this mask being pierced with a pair of small, laterally spaced circular apertures, L and R, the separation between the apertures being approximately equal to the normal interocular distance. As a result of this arrangement, the small portions of the lens which receive light entering through the two apertures function similarly to two separate lenses. Thus, a "left-eye" view of the subject is directed toward the film by one element and a "right-eye" view is so directed by the other element. The lenticules on the film reimage these two views as a large number of minute, disc-shaped images. Each such disc, occupying but a fraction of the area of emulsion behind the associated lenticule, contains a minute image of some small element of the subject. The "left-eye" and "right-eye" images are interdigitated laterally across the film emulsion as denoted in the diagram by, respectively, l and r.

Consider the mask M to be pierced with a third small aperture located midway between the apertures L and R. This will result in the formation of a third array of little disc images, interdigitated between those denoted by l and r. It will be clear that the third view constituted by this additional array of images will represent an aspect of the subject which is rightward with respect to that due to the aperture L, and leftward with respect to that due to the aperture R.

Next, consider the mask M to be pierced with further small apertures at intervals extending, not only across the horizontal dimension of the mask, but also along the vertical dimension (i.e., the dimension normal to the plane of the diagram). Each such aperture will result in the formation of a further array of image elements displaced from their neighbors by amounts, and in directions, dependent upon the location of the aperture in the mask M.

Now consider, finally, that the mask M is entirely removed, this being equivalent to introducing a sufficiently large number of overlapping apertures. The image formed behind each lenticule will now be a small disc-shaped image of an element of the subject, the aspect of that element which is presented by the disc image changing progressively along every axis in the plane of the disc. According to the values chosen for the optical components of the system, matters can be so adjusted that the little disc images are either spaced apart, just abutting, or overlapping; under any of these conditions, moire effects will be exhibited by the completed picture. In order that such moire effects may be avoided, or at least reduced to a level at which they are not obtrusive, it is necessary to arrange matters so that adjacent elementary images in the array of which the picture is composed are precisely abutting, and not appreciably overlapping or spaced apart; moreover, it is desirable that the entire area of the photosensitive surface within the film format shall undergo exposure, but not multiple exposure. It will be evident that it is impossible for all these conditions to be fulfilled if the elementary images are disc-shaped. Thus, for example, with disc-shaped images, matters can be so adjusted that each disc just contacts the periphery of each of the adjacent discs. However, such contact is possible at only certain points on the periphery of each disc, thus leaving a multiplicity of unexposed areas.

It is a feature of the present invention to provide means for modifying the shape of the elementary images so that the conditions necessary for obviation or minimization or moire effects can be achieved. One of the preferred methods involves the use of a plate or diaphragm having a square aperture as shown schematically in FIGS. 13a and 13b. The effect of this aperture plate, used in conjunction with lenticules having square peripheries, is to change the shape of the elementary images from circular to square, and to provide that the sides of adjacent squares are precisely abutting, and neither overlapping nor spaced apart. It is possible, at least in theory, to fulfill the required conditions by the use of elementary images having a shape other than square or hexagonal, but departure from the preferred shapes introduces problems in the manufacture of the lenticular screen and in other areas without yielding any additional advantage to offset these difficulties.

FIGS. 14a, 14b and 14c are diagrams similar to FIGS. 13a, 13b and 13c, respectively, but the aperture and lenticules have hexagonal peripheries. Both sets of diagrams will be considered in more detail later.

IMAGE ORIENTATION

The series of six diagrams in FIGS. 15a–15f will facilitate an understanding of certain characteristic features peculiar to optical imaging processes involving the use of spherically lenticulated screens or film.

Consider, first FIG. 15a, which diagram represents a square object or target subdivided into four smaller squares bearing the numerals 1, 2, 3 and 4. If imaged by a regular camera lens, the orientation of the numerals, as viewed from the back of the camera, will be as indicated in FIG. 15b. If the image is recorded on a photographic plate or film, a print can, of course, be made; this print, after rotation through 180° in the image plane, will display the numerals in the same orientation as that of the numerals on the target. The print is represented by FIG. 15c, which diagram is identical to FIG. 15a.

Now consider FIGS. 15d to 15f, the target being represented by FIG. 15d. The remaining two diagrams illustrate the results of imaging the target by the method described below. Consider four adjacent spherical lenticules, in square array, on a piece of film or a screen used in conjunction with an imaging system of the type shown in FIGS. 13a and 13b. The image formed at the focal plane of an individual lenticule is not an image of the entire scene within the field of the primary (camera) lens; it is an image of some minute portion of that scene, which particular portion being dependent upon the location of the lenticule within the camera format. Accordingly, it is to be assumed in the present case that FIG. 15d represents just a very small portion of a much larger target, the portion illustrated being of such dimensions that its image precisely fills the area of the total format of the four-lenticule array. Now, in the absence of the lenticules, the image would be oriented as shown in FIG. 15b. However, due to the presence of the lenticules, the elementary image within the format of each individual lenticule undergoes rotation about its center through 180°; accordingly, the orientation becomes as shown in FIG. 15e.

In order that the complete picture (of which FIG. 15e, as previously indicated, represents just a small part), in the form of either the original or a print may be viewed the right way up, it is necessary for the complete picture to be rotated through 180°. This further rotation results, finally, in the orientation represented in FIG. 15f. Thus, the picture as a whole is now the right way up, element No. 1 being above element No. 3 and to the left of element No. 2, while element No. 4 is below element No. 2. However, each individual element is now inverted; in consequence of this inversion, the panoramic effects exhibited by pictures produced by this technique are the opposite of those experienced when viewing an actual three-dimensional subject or scene. Thus, when viewing an actual scene, if the observer moves his head to the left, a more leftward aspect of the scene is presented to his eyes; if he moves his head to the right, then the view presented to his eyes is more rightward in aspect. Again, when viewing a real-life scene, if the observer raises his head, the aspect of the scene presented to his eyes changes to one appropriate to his more elevated viewpoint. Similarly, if he lowers his head, the aspect changes to one appropriate to his lower viewpoint. However, in the case of a picture produced by the method under discussion, the changes in aspect which result from changes in the observer's viewpoint are the opposite of those just indicated. If, for example, the observer moves his head in a lateral direction, then the aspect of the image presented to his eyes becomes more rightward if he moves his head to the left, or more leftward if he moves his head to the right. Similarly, if the observer moves his head in a vertical direction, the aspect changes to one appropriate to a lower viewpoint if he raises his head, or to one appropriate to a higher viewpoint if he lowers his head.

It is found, in practice, that the anomalous effects referred to above are not at all disconcerting to the observer; in fact, they will usually pass completely unnoticed by him unless his attention is drawn to them by someone who is familiar with the optical characteristics of the process. There are, moreover, methods–generally involving sequential printing or reproduction–by which these anomalies can be avoided so that the panoramic effects are consistent with those observed in everyday visual experience. These methods involve rotation of the individual picture elements, instead of the array as a whole, through 180° in the image plane. There are potential uses for such procedures in some electronic (e.g., television) applications of the invention. For example, inversion of the picture elements displayed on, say, the screen of a cathode ray tube can be accomplished by appropriate design and arrangement of the scanning circuitry.

It might, perhaps, be thought that inversion of the individual image elements, as represented in FIG. 15f, would result in impairment of the quality of the picture. However, in general, such is not the case for the following reason. In most practical cases the image elements are so small that the information within the area of a single element is insufficient for identification as a feature of the picture. Such identification is made possible, however, by the eye's ability to recognize the larger amount of information contained within the net area of several adjacent elements. As an analogy, consider the case of a lithographed color picture which, as is known, is composed of a large number of groups of minute colored dots; unless a very coarse screen has been used for the lithography, neither a single dot nor even a single group of dots can be discerned by the naked eye, and several adjacent groups of dots are needed to construct an identifiable detail of the picture. It is, moreover, a demonstratable fact that each and every group of dots can be rotated through 180° (or any other angle) about its own center without producing any observable effect on the picture. Such rotation through 180° is, as will be understood, equivalent to image inversion of the type discussed in connection with FIG. 15f.

FIG. 16 illustrates, in a simplified manner, the effect of the two-fold image-inversion resulting from the joint action of the primary lens and the spherical lenticules; that is to say, the diagram shows why a contact print, a reversal positive or a negative produced in accordance with the invention may be seen either stereoscopically or pseudoscopically, depending upon the observer's viewing distance. The sketch represents a piece of spherically lenticulated film being viewed by an observer, first from position (a), and then from the more distant position (b). In each instance the observer's left and right eyes, respectively, are denoted by $E_1$ and $E_2$. At the focal plane of each lenticule, the numerals 1 and 2 are used to denote the edges of the elementary image depicting, respectively, the extreme leftward and extreme rightward aspects of that image. Thus, for the picture to be seen in the stereoscopic mode, light rays emanating from points in the elementary images nearer to the edges denoted by the numeral 1 should reach the observer's left eye; similarly, rays emanating from points nearer to the edges denoted by the numeral 2 should reach his right eye. Consideration of the diagram will show that, due to the refractive effect of the lenticules, this condition is fulfilled when the observer is at a location such as that denoted by (a). When, however, he moves to a more distant location, such as that denoted by (b), the opposite condition prevails, with the result that the picture is seen in the pseudoscopic mode.

Consider that the picture has been so recorded or reproduced that the little numerals 1 and 2, respectively, denote the extreme rightward and leftward (instead of vice versa) aspects of the elementary images. This can be accomplished by means of the transposition process described in the applicant's co-pending U. S. Pat. Application Ser. No. 747,996, entitled "Improvements in Integral Photography." Clearly, the situation will now be such that the picture is seen pseudoscopically from relatively near viewpoints, such as (a), and stereoscopically from more distant viewpoints, such as (b).

It is to be remembered that when a photograph, in the form of either a negative or a reversal positive, recorded with a regular camera lens is viewed from the side which faced the lens, the subject as a whole will be seen laterally inverted or perverted. Accordingly, if desired, means of compensating for this lateral inversion or perversion may be used in conjunction with any of the image-recording systems comprising features of this invention. Such means may take the form of an additional optical member, such as a plane mirror or a 45° prism, located on the axis of the system in order to cause a compensating lateral inversion or perversion of the imagery before it reaches the photosensitive surface. This procedure will be understood by those familiar with the art and hence, in order to avoid unnecessary complication, no such additional optical members are included in the accompanying drawings.

BASIC OPTICS

Reverting to FIGS. 13a, 13b and 13c, L denotes the primary or camera lens, and F denotes a piece of the spherically lenticulated film on which the subject or scene is recorded. The lens L is provided with an aperture plate A which must be located in the plane of one of the lens pupils. In the illustration, the aperture plate is represented as being between the front and back components of the lens in the position normally occupied by the iris diaphragm, this being generally the most suitable location. The aperture plate is shown in sectional side elevation in FIG. 13a, and in front (or rear) elevation in FIG. 13b. The aperture itself is square.

The dimension $i$ is the effective focal distance of the lens L from the film F; thus, this distance exceeds the focal length of the lens except in some special cases (e. g., high-altitude aerial photography) in which the lens is focused at infinity. In view of the fact that the thickness of the film is insignificant compared to the distance $i$, it is of little consequence whether the latter dimension be measured from the lens to the lenticules, to the film emulsion, or to some intermediate plane. For the present purpose it is most convenient for the distance $i$ to be, as indicated in the diagram, that from the lens to the plane containing the centers of curvature of the lenticules. The symbols $f$, $i'$, $r'$, $w$ and $\beta$ have the same significance in FIG. 13a as in FIG. 1, the acceptance angle of the lenticules again being denoted by $2\beta$. In addition, $2\alpha$ is used to denote the effective $f$-cone angle of the lens L which would be available if the aperture plate A were to be replaced by a regular, circular stop or iris diaphragm. For the most economic design of the complete system, it is preferable that this $f$-cone angle be that corresponding to the maximum aperture at which the lens is designed to operate. The radius of the circular aperture is denoted by $r$, and the half-length of a side of the square aperture by which the circular aperture is replaced is denoted by $s$.

With the circular aperture in position, the imagery formed at the focus of each lenticule would occupy a circular area having a diameter $d$ (see FIG. 13a) in excess of the pitch distance or lenticule width $w$. Hence, the recorded picture would be composed of a multiplicity of little overlapping discs, and would consequently exhibit intolerable moire effects when viewed through the lenticulated surface. If the diameter of the circular aperture were to be reduced so that the effective $f$-cone angle of the primary lens is equal to the acceptance angle of the lenticules, then:

$$\alpha = \beta, \text{ and } d = w$$

Under these conditions, the picture would still be composed of a multiplicity of elementary disc-shaped images, but the peripheries of adjacent discs would then be just in contact, and neither appreciably overlapping nor spaced apart. In consequence, each little image disc would be surrounded by four star-shaped areas of unexposed emulsion, this resulting in a poorly resolved picture; further, the pattern formed by the little star-shaped areas would cause intolerable moire effects. If the diameter of the circular aperture were to be still further reduced so that:

$$\alpha < \beta, \text{ and } d < w$$

this condition would be made even worse, the image discs becoming smaller and the star-shaped areas becoming larger.

The solution of the above problem constitutes an important feature of the present invention, and FIGS. 13a and 13b are to be regarded as representative of the means by which the desired end can be attained. It is to be imagined that the lenticules on the film F have square peripheries, each bounding an area $w \times w$, their shape thus matching, to a reduced scale, that of the square aperture in the plate A. Accordingly, the exposed area at the focus of each lenticule will be square-shaped instead of disc-shaped; it is required that the dimensions of each of these elementary areas shall be substantially equal to $w \times w$. Consideration of the diagram shows that this condition will be met if the pencil of rays incident on the lenticule $l$ is appropriately restricted; thus, instead of the pencil containing all the rays within the effective $f$-cone, the vertex angle of which is $2\alpha$ and the base radius of which is $r$, it must contain only those rays within the pyramid the opposite faces of which include the lenticule acceptance angle $2\beta$, and which has a square base with sides having a half-length $s$. In order to achieve the most economic design for the system, the value of $r$ should be the minimum that permits this to be accomplished. The modified pencil will then contain those rays comprising the inscribed pyramid of the $f$-cone. FIGS. 13a and 13b depict this ideal situation. The mathematical relationships are:

$$\text{effective } f\text{-cone angle, } 2\alpha = 2\tan^{-1}(r/i) \quad (6)$$

$$\text{acceptance angle of lenticules, } 2\beta = 2\tan^{-1}(s/i) \quad (7)$$

$$\text{and radius of lens aperture, } r \geq 1.4142 s \quad (8)$$

The last of these three expressions is derived from the fact that, in the ideal or limiting situation referred to above, the length of the semi-diagonal of the pyramid base is equal to the radius of the base of the cone.

It is to be noted that the relationships between the properties of the primary lens, the aperture plate and the lenticules are established without reference to the angular field of the complete photographic system. This is because the angular field of the system is dependent only upon that of the primary lens; this angular field is unaffected by the use of a specially (e.g., square) shaped aperture in place of the more usual iris diaphragm, or by the use of spherically lenticulated film in place of regular, non-lenticulated film. Thus, the acceptance angle of the lenticules determines the angular width of the zones throughout which the completed picture can be viewed stereoscopically, while the field angle of the primary lens determines the angular field subtended by the scene recorded.

It is important to note that the use of the aperture plate A in conjunction with the lens L does not in any way restrict or reduce the area of the lenticulated surface upon which light is incident; even if the size of the aperture were to be reduced to that of a pinhole, light from that pinhole would still reach every part of the surface of every lenticule. In the case of any lens, there is only one "perfect" or "ideal" $f$-cone, that is, the $f$-cone the vertex of which lies on the optical axis. However, the image at the focal plane is formed by light rays constituting an indefinitely large number of oblique cones, the vertex angle of each such cone being a little less than that of the $f$-cone by an amount dependent upon the distance of its vertex from the optical axis. Similarly, with the aperture plate A in FIGS. 13a and 13b in use, there is only one perfect "$f$-pyramid," this being the inscribed pyramid of the perfect $f$-cone. Consequently, this $f$-pyramid is the only one the opposite faces of which subtend an angle precisely equal to that denoted in the drawing by $2\beta$, and which illumines the central region of the lenticule $l$. The entire surface of the lenticule is, however, illumined by light rays constituting other, almost identical, pyramids. Thus, for example, the rays $\rho_1$ and $\rho_2$, also incident on that lenticule, include an angle almost exactly equal to $2\beta$. Similarly, the angle included between the rays $\rho_3$ and $\rho_4$ is, again, almost exactly equal to $2\beta$. Owing to the refractive action of the lenticule, the pyramid of light defined by the outer pair of rays $\rho_2$ and $\rho_3$ converges to attain minimum cross-sectional dimensions at the plane containing the center of curvature. Thus, if the film were to be sectioned transversely at this plane, a minute square of light would be seen, the width of the square being equal, to a close approximation, to one-third the width of the lenticule. From this plane the rays diverge, coming to a focus at the emulsion surface, forming thereon a square image the width of which is equal to the width of the lenticule.

In designing a photographic system of the type under discussion, it is generally sufficient to base calculations only on the perfect $f$-cone and the inscribed pyramid. It is very important, nevertheless, to be aware of the existence of the multiplicity of oblique pyramids of rays which illumine the entire surface of the lenticular array; disregard of these rays has led, in the past, to misconceptions concerning the configurations of the lenticules which can be employed. Thus, the use of spherical lenticules having circular peripheries, as has been proposed in the past, is entirely unacceptable; that is so whether the lenticules be arranged in square array, as represented in FIG. 17, in honeycomb array, as represented in FIG. 18, or in any other type of array. In the case of the arrangement depicted in FIG. 17, approximately 21 percent of the surface is not lenticulated, this figure representing the difference between the areas of a square and the inscribed circle. With the arrangement shown in FIG. 18, the non-lenticulated area amounts to approximately 9 percent of the total, this figure representing the difference between the areas of a hexagon and the inscribed circle. Accordingly, in the former case 21 percent, and in the latter case 9 percent, of the imagery available from the primary lens can make no useful contribution to the recorded picture, this representing a serious loss of resolution. Far more serious, however, is the fact that the non-lenticulated areas adjacent each lenticule would result in the production of an intolerable moire pattern when the picture is being viewed. The non-lenticulated areas would either (1) transmit light direct from the primary lens without this portion of the light being reimaged by the lenticules, or (2) obstruct this portion of the light from reaching the photographic emulsion, depending upon whether the non-lenticulated areas are left transparent or rendered opaque by the application of some type of pigment.

If the lenticules are disposed in a honeycomb or staggered array, as in FIG. 18, then their peripheries should be either hexagonal or square, not circular. FIGS. 14a, 14b and 14c are, as mentioned earlier, similar to FIGS. 13a, 13b and 13c, but showing the use of lenticules with hexagonal peripheries in conjunction with an aperture plate having the necessary, corresponding hexagonal aperture. With the hexagonal aperture, the relationship between $r$ and $s$ is the same as in the case of a square aperture, that is to say, we must have $r$ 1.4142$s$; this follows from the fact that the aperture in FIGS. 14a and 14b represents the inscribed hexagon of the square aperture in FIGS. 13a and 13b.

LENTICULAR FILM PARAMETERS

As a typical, practical example, the approximate characteristics of spherically lenticulated film suitable for use in conjunction with a lens having an effective working aperture of $f/2.5$, will now be determined.

When dealing with $f$-numbers, it is desirable to note that there is a basic law in optics which can be expressed in the following way:

$$\alpha = \sin^{-1}(1/2 \times f\text{-number}) \quad (9)$$

in which expression $\alpha$ denotes the one-half $f$-cone angle. A discussion of this law can be found in most textbooks on photographic optics, and is considered unnecessary here. Using equation (9) in connection with the present example, then, we may write:

$$\alpha = \sin^{-1}(1/2 \times 2.5)$$
$$= \sin^{-1} 0.2000 = 11°32'$$

Now, from equation (6):

$$11°32' = \tan^{-1}(r/i)$$

Having regard to the relationship between $r$ and $s$ indicated in (8), the above expression can be rewritten as:

$$11°32' = \tan^{-1} 1.4142 \, (s/i)$$

But from (7):

$$s/i = \tan \beta$$

and hence $11°32' = \tan^{-1} 1.4142 \tan \beta$
from which $$0.2041 = 1.4142 \tan \beta$$

so that $$\beta = \tan^{-1} 0.1443 = 8°13'$$

Accordingly, the complete acceptance angle, $2\beta = 16°26'$

It is to be noted that the use of a sine function in equation (9) is not contradictory to the mathematical relationships specified in the expressions (6), (7) and (8), and shown schematically in FIGS. 13a and 14a. Thus, for example, the angle $\alpha$ can be expressed in terms of its sine, cosine, tangent or any other convenient trigonometrical function; it is in the conversion of that angle into the equivalent $f$-number, or vice versa, that the use of the sine function is to be preferred. Nevertheless, when comparatively small angles are involved, use of the tangent function is permissible as an approximation. In the case of the preceding example, adopting this alternative method of calculation:

$$f\text{-number} = 2.5 = i/2r$$

so $$r/i = 1/5 = \tan^{-1} \alpha$$

and $$0.2000 = \tan^{-1} 1.4142 \tan \beta$$

or $$\beta = \tan^{-1} 0.1415 = 8°03'$$

Hence, $$2\beta = 16°06'$$

Thus, from the preceding calculations, it is apparent that, provided that the acceptance angle of the lenticules is approximately 16° (or narrower) a lens working at a relative aperture of $f/2.5$ (or wider) can be adapted by the incorporation of an aperture plate of appropriate size. For the present purpose, it will be assumed, arbitrarily, that the acceptance angle selected is 15°. Assuming further, that the number of lenticules per linear inch is to be 175, then, using equation (5):

$$15° = 2 \tan^{-1}(1/350f)$$

so that $$7°30' = \tan^{-1}(1/350f)$$

from which $$0.1317 = 1/350f$$

and $$f = 1/46.095 = 0.02169 \text{ inch}$$

The thickness of the film base is then obtainable from (3), thus:

$$0.02169 = 2i'/3$$

from which $i' = 0.03254$ inch.
The radius of curvature of the lenticules is also given by (3), thus:

$$0.02169 = 2r'$$

from which $r' = 0.01085$ inch.
Finally, using the relationship between $f$ and $w$ indicated in (4), it may be written:

$$f\text{-number} = 0.02169/0.00572 = f/3.8 \text{ approximately}$$

As will be understood, the optical properties of the film would remain virtually unchanged if the base thickness and the lenticular pitch distance were to be increased or reduced by the same proportionate amount. Thus, for example, with 350 lenticules per linear inch on a film 0.01627 inch thick, the acceptance angle would still be 15° and the relative aperture would still be approximately $f/3.8$.

PRINTING TECHNIQUES

FIG. 19a shows schematically a method of making contact prints, of either the transparent or opaque type, from pictures recorded by the means depicted in FIGS. 13a or 14a. For the purpose of explanation, it will be assumed that the optical arrangement used for recording the pictures is that shown in FIG. 13a. As shown in FIG. 19a, a source of illumination I located behind a diffusing screen S is used to fill the field of the lens L with evenly diffused light. The lens L is the same as, or equivalent to, the lens in FIG. 13a. As in the case of the lens in the earlier diagram, the lens L is provided with an aperture plate or diaphragm having a square aperture; the dimensions of this aperture are so correlated with the other parameters of the optical system that each spherical lenticule on the film F forms a minute, square image of the aperture on the film emulsion. Thus, the film emulsion is illumined by an array of square patches of light, adjacent patches being closely abutting, and neither appreciably overlapping nor spaced apart. It is to be imagined that the film emulsion carries a picture, duly processed, recorded by the method shown in FIG. 13a, and that the thickness and (or) other characteristics of the film are such that the material has undergone no perceptible distortion during processing. The sheet or strip of photosensitive material on which the print or reproduction is being made is shown at P in FIG. 19a. If this reproduction is to be in the form of a transparency, the film or other photosensitive material used should, as in the case of the film F, possess such characteristics that it does not undergo perceptible distortion as a result of processing. If the reproduction is to be in the form of an opaque print, such distortion can be obviated very conveniently by using, for the material at P, emulsion-coated metal (e.g., aluminum) foil instead of the more usual emulsion-coated paper.

As will be noted from FIG. 19a, the material at P is not lenticulated, the emulsion surface being in direct contact with the emulsion surface of the film at F. After the exposure has been made and processing has been completed, a lenticular screen L' (see FIG. 19b) is laminated to the emulsion surface of the print P. In general, the optical characteristics of this screen are the same as those of the lenticular film F. However, this is not an essential requirement; the essential requirement is that the pitch distance between the lenticules (about all axes) on the screen L' shall be the same as the pitch distance between the lenticules on the film F. Provided that this condition is fulfilled and that the screen is correctly aligned with respect to the print, no undesirable moire effects will result. Insofar as the other characteristics of the lenticular arrays are concerned, it is permissible, and sometimes desirable, for the optical properties of the lenticules on the screen to differ from those on the film. For example, by increasing the acceptance angle of the lenticules on the screen compared to that of the lenticules on the film, the angular width of the viewing zones throughout which the print can be seen stereoscopically is increased, although, at the same time, the magnitude of the stereoscopic effect is reduced. Conversely, by reducing the acceptance angle of the lenticules on the screen compared to that of the lenticules on the film, the angular width of the stereoscopic viewing zones is reduced while the magnitude of the stereoscopic effect is increased.

Use of the lens L and square aperture, as described above, is not absolutely necessary, as prints can be made with the aid of other methods of illumination. The method described, however, tends to produce prints of higher quality by minimizing undesirable scattering and diffusion of light within the film base which would otherwise be caused by the lenticulated nature of the surface through which the printing light must enter the film.

FIG. 20 is a schematic diagram showing a method of making prints, at 1:1 or unit magnification, in the form of transparencies, spherically lenticulated film being used for both the input material $i$ and output material $o$.

The general arrangement of this type of printer is that of a known type of symmetrical telecentric system. However, in order to adapt the arrangement for use in connection with the present invention, the mask or aperture plate $m$ which is customarily inserted between the two halves of the system must be of a special nature. That is to say, the shape and size of the aperture should be appropriately correlated with the optical arrangement used for recording the input imagery. Thus, for example, if the input imagery is recorded by the method shown in FIG. 13a, the camera lens being provided with a diaphragm having a square aperture, then the mask $m$ in FIG. 20 should likewise be provided with a square aperture of such dimensions that each of the elementary images of that aperture formed on the emulsions of the films $i$ and $o$ occupies an area corresponding to the format of a single lenticule. It is preferable, for obvious reasons, for the size of the aperture in the mask $m$ to be adjustable.

ADDITIVE COLOR PROCESS

FIGS. 21, 22 and 23 are used in explanation of an additive process for the recording and viewing of three-dimensional color pictures on black-and-white photographic stock.

Referring, first, to FIG. 21, the drawing represents an alternative form of aperture plate, embodying color filters, which can be used instead of a clear aperture plate in a photographic system of the type shown in FIG. 13a. As will be understood, the filters can be arranged in ways other than that illustrated; for example, they can be provided with hexagonal peripheries in order that the aperture plate may be used in conjunction with a photographic system of the type shown in FIG. 14a. For explanatory purposes, however, it will be assumed that the filters have square peripheries. It is preferred that each of the three filters should be of substantially the same area.

Consider that an aperture plate of this type is substituted for the unfiltered aperture plate in FIG. 13a. Then, as will be understood, a minute reproduction of this modified type of aperture plate will be imaged in the format of each lenticule. Thus, the area of the imagery occupying the format of each lenticule will be divided up into three portions, the gray scale of the associated portions of the emulsion being modulated according to the amount of light transmitted by the corresponding filters in the aperture plate.

The latent black-and-white negative is now converted into a positive transparency, by either reversal processing or normal development followed by the making of a print. This black-and-white positive transparency can now be viewed both stereoscopically and in natural color by using, as a viewing device, equipment of the type shown schematically in FIGS. 22 and 23, the former diagram representing a side elevation of the arrangement, the latter being a plan view. In both diagrams I denotes an illuminant, S a diffusing screen, and S' a spherically lenticulated screen the lenticules of which match those of the film F which is being viewed. One of the observer's eyes is shown at E in FIG. 22; his left and right eyes respectively are shown at $E_1$ and $E_2$ in FIG. 23. The lens L is the same as, or equivalent to, that used in taking the picture, and is likewise provided with an aperture plate of the type represented in FIG. 21. The letters B, G and R, respectively, are used to indicate the blue, green and red portions of the filter.

In the discussion of FIG. 19a, it was explained that each spherical lenticule on the film forms a minute, square image of the (clear) aperture on the film emulsion. In a similar way, with the arrangement shown in FIGS. 22 and 23, each lenticule on the screen S' forms a minute, square, colored image of the three-color filter, this image being focused on the emulsion of the exposed and processed positive transparency F. It is to be remembered, too, that the gray scale of the elementary image within the format of each lenticule of the transparency has been modulated, by the use of a three-color filter, in respect of both the brightness and the color of the corresponding element of the actual subject. Thus, for example, if the elementary image behind a particular lenticule corresponds to a predominantly red element of the subject, the central region of the emulsion will be more transparent than the outer regions. Now, due to the action of the three-color filter in the lens L, the central region is illumined by predominantly red light; hence, the elementary image will be seen by the observer as predominantly red. If, on the other hand, the elementary image corresponds to, say, a predominantly blue or green element of the subject, the central region will be less transparent than the outer regions; accordingly, the elementary image will be seen by the observer as predominantly blue or green.

It will be understood that the recording of color information by the means indicated is effected jointly with the recording of stereoscopic information. Hence, binocular vision, as represented in FIG. 23, enables the observer to see the complete picture both stereoscopically and in natural color.

In order that the transparency, together with its associated lenticular array, may be conveniently brought into correct alignment with the lenticular screen S', it is desirable that at least one of these elements be so mounted as to permit fine adjustment of its orientation, both angularly and linearly.

ADAPTATION TO SMALL CAMERA FORMATS

With stereo photographic systems involving the use of a lens of large diameter for production of the necessary parallax, a problem arises when it is desired to adapt such systems for use in conjunction with image formats of small dimensions, such as those associated with miniature cameras, television camera tubes, etc. This is because it is difficult to design and manufacture lenses which possess both large diameter and short focal length. FIG. 24 shows schematically a method of overcoming this difficulty in accordance with a feature of the present invention.

In the diagram, $L_1$ represents a lens of large effective radius $r_1$ operating at a focal distance $\lambda_1$. At, or close to, the focal plane of $L_1$ is located a field lens $L_3$ of radius $r_3$, the field lens being at a distance $\lambda_3$ in front of a smaller, objective lens $L_2$ of radius $r_2$. The lens $L_2$ operates at a focal distance $\lambda_2$ from the image plane F. In the sketch, this lens is represented as being provided with an aperture plate A of the type previously described, but, from earlier discussion of the topic, it will be understood that there are alternative locations in the system at which a corresponding aperture plate could be inserted. It is also to be understood that the image-recording medium at F may be either spherically lenticulated film, a spherically lenticulated screen-film combination, the spherically lenticulated faceplate of a television camera tube, or any other desired image-recording or image-receiving medium employed in conjunction with spherical lenticules. The operation of the optical system may be summarized in the following way. An aerial image of the subject or scene being recorded is formed at, or in the vicinity of, the plane of the field lens $L_3$ by the lens $L_1$. This image constitutes the object insofar as the lens $L_2$ is concerned, and this lens, acting in conjunction with the field lens, reimages that object to a reduced scale at the plane F. The characteristics of the aperture plate A are appropriately matched with those of the lenticules at F in the manner previously described; hence, the recorded imagery is of the same nature as that produced by the arrangements shown in earlier diagrams, such as FIGS. 13a and 14a. Thus, the parallax effect due to the large lens $L_1$ is reproduced in the imagery recorded in the small format at F. As will be understood, the field angle subtended by the recorded scene corresponds to that of the lens $L_1$, this angle being denoted by $\phi$ in the diagram.

The following calculations will show, as a numerical example, how an optical system of the type under discussion can be adapted for use in conjunction with a television camera. For the sake of simplicity, the calculations will be approximate only, based on simple thin-lens theory. The following assumptions are made: (1) the camera tube is of the image orthicon type having, in accordance with current practice, a format the diagonal of which measures 1.6 inch; (2) the lens $L_1$ has an effective diameter of 3 inches, operates at a focal distance of 15 inches, and covers a format the diagonal of which measures 8 inches; (3) the lens $L_2$ is located at a distance of 10 inches from the field lens $L_3$. Accordingly, summarizing these assumptions:

$r_1 = 1.5$ inch        $r_3 = 4$ inches
$\lambda_1 = 15$ inches    $\lambda_3 = 10$ inches In addition, since the linear dimensions of the image formed by the lens $L_1$ are 5 times as great as those of the image formed by the lens $L_2$:

$$\lambda_2 = \lambda_3/5 = 2 \text{ inches.}$$

The effective relative aperture of the lens $L_1$ amounts to:

$$15/3 = f/5.0$$

and that of the lens $L_2$ is calculable as follows:
Denoting the one-half $f$-cone angle of the lens $L_1$ by $\alpha_1$, then the radius of the lens $L_2$ is given by:

$r_2 = \lambda_3 \tan \alpha_1$
$= 10 \times 1.5/15 = 1$ inch

Hence, the effective relative aperture of the lens $L_2$ amounts to:
$2/2 = f/1.0$ It will be noted that the ratio (5:1) between the $f$-numbers of $L_1$ and $L_2$ is, as is to be expected, the same as that between the linear dimensions of the images formed by these two lenses. Denoting the one-half $f$-cone angle of the lens $L_2$ by $\alpha_2$, then:

$\alpha_2 = \tan^{-1} r_2/\lambda_2$
$= \tan^{-1} 1.0/2.0 = \tan^{-1} 0.5000$
$= 26°34'$ Accordingly, the complete $f$-cone angle amounts to:
$2\alpha_2 = 53°08'$
which angle governs the acceptance angle of the lenticules at the plane F. Thus, using $\beta$ to denote the one-half acceptance angle:
$\beta = \tan^{-1} \tan \alpha_2/1.4142$
$= \tan^{-1} 0.3537$
$= 19°29'$
and $2\beta = 38°58'$ In order to determine a suitable pitch distance for the lenticules, it is necessary to consider the resolution normally available with a high-quality camera tube when used in a commercial television system. It is customary to express this type of resolution in terms of TV lines; for the present purpose it will suffice to assume, as an approximation, that the resolution is 400 TV lines, both horizontally and vertically, this being equivalent to $16 \times 10^4$ picture elements. Assuming, further, that 10 such elements are needed to form an identifiable detail within the format of a single lenticule, it follows that the total number of lenticules required amounts to $16 \times 10^3$. Now, the format of the camera tube measures $0.96 \times 1.28$ inch, conforming to the usual $3 \times 4$ aspect ratio. Hence, a simple calculation shows that the required number of lenticules will result if the faceplate is embossed with 110 horizontal rows, each containing 146 lenticules. This corresponds to 114 lenticules per linear inch, or a pitch distance of 0.0088 inch. Now, in deriving equation (5), it was found that:

$$\tan \beta = w/2f$$

Accordingly:

$$f = 0.0088/2 \times 0.3537 = 0.0124 \text{ inch}$$

and from (3), the thickness of the faceplate is given by:

$$i' = 3f/2 = 3 \times 0.0124/2 = 0.0186 \text{ inch}$$

In order that the transmitted picture may be seen stereoscopically, the receiver screen must be viewed through a lenticular screen which corresponds with that provided on the camera tube. Thus, assuming that the receiver screen is the phosphor-coated surface of a cathode ray tube, the lenticular screen must be so located that the phosphor-coated surface lies at, or substantially at, the focal plane of the lenticules. In the case of the present example, the lenticular viewing screen must be embossed with $16 \times 10^3$ lenticules in an array having a $3 \times 4$ aspect ratio, the overall dimensions of the array matching those of the television picture. Thus, if the diagonal measurement of the picture is 16 inches, compared with the 1.6 inch diagonal of the camera tube format, then the pitch distance of the lenticules on the viewing screen must be:

$$10 \times 0.0088 = 0.088 \text{ inch}$$

It is not essential that the lenticules on the viewing screen shall have the same acceptance angle as that of the lenticules on the camera tube faceplate. If, however, it be assumed that they are to have the same acceptance angle, then the thickness of the viewing screen will amount to:

$$10 \times 0.0186 = 0.186 \text{ inch}$$

Tests conducted with spherically lenticulated screens indicate that the lenticular pattern is unobtrusive provided that the viewing distance is not less than about 600 times the lenticular pitch distance. It will be evident, therefore, that a pitch distance of 0.088 inch can be considered satisfactory for viewing distances in excess of about 4 or 5 feet.

The figures quoted above are to be regarded as representative only, and not in any way restricting the practical embodiment of the invention.

Various means may be adopted to ensure adequate picture linearity and minimize moire effects, but such means do not constitute features of the present invention.

If desired, the arrangement shown in FIG. 24 can be made more compact by the use of so-called "folded optics," that is to say, by the interposition of one or more reflecting surfaces between the lenses $L_1$ and $L_3$, and (or) between the lenses $L_2$ and $L_3$. An arrangement of this type is shown in FIG. 25; in this sketch $M_1$ and $M_2$ denote a pair of mirrors, preferably of the first-surface type, each of which mirrors causes the optical path to be deflected through an angle of approximately 90°.

The sketch in FIG. 26 is a part-sectional plan view representing an observer, whose left and right eyes, respectively, are denoted by $E_1$ and $E_2$, viewing a stereoscopic television picture produced in accordance with the feature of the invention which has been described. In the specific embodiment shown, the lenticules are formed on the outer surface of the faceplate F of the picture tube T. The phosphor-coated screen is denoted by P, and S denotes a glass safety shield of the type customarily incorporated in television receivers.

Having fully described my invention, it is to be understood that I am not to be limited to the details herein set forth but that my invention is of the full scope of the appended claims.

I claim:

1. A stereoscopic photographic system comprising: a primary lens originally having a circular aperture of radius $r$; an aperture plate located in the plane of one of the lens pupils having an aperture therein with a square or hexagonal peripheral configuration and having a half width $s$ between opposite parallel edges, where $s$ is equal to or less than $r/1.4142$; a combination multi-element screen and photographic backing means positioned a distance $i$ from said aperture plate, said combination being located substantially at the focus of said lens, the elements of said screen having a square or hexagonal peripheral configuration matching that of the aperture in said aperture plate but on a reduced scale with respect thereto and each element having an acceptance angle of $2 \tan^{-1} s/i$, the characteristics of the lens, the aperture and the elements being so coordinated that the elementary image at the focus of each element on the surface of said photographic backing means substantially fills the image format of that element so that adjacent elementary images are neither appreciably spaced apart nor overlapping.

2. The stereoscopic photographic system defined in claim 1, in which said screen comprises a lenticular screen having square or hexagonal lenticules shaped and oriented in a space-filling configuration so that there are no appreciable non-lenticulated areas between adjacent lenticules.

3. The system claimed in claim 2, wherein the surfaces of said lenticules have substantially spherical curvature.

4. The system as claimed in claim 1, wherein said multi-element screen comprises a pair of cylindrically lenticulated screens extending at right-angles to one another with the lenticulated surfaces thereof in contact with one another.

5. The system defined in claim 1, in which said multi-element screen comprises a member of opaque material having apertures therein of the same configuration as the aperture in said aperture plate but on a reduced scale with respect thereto.

6. The system as claimed in claim 2, wherein said combination is a composite unit, said light-sensitive backing means being a photographic film comprising a transparent base, one surface of which carries light-sensitive emulsion, said lenticules being formed on the surface of the film base opposite that surface which carries the light-sensitive emulsion.

7. The system as claimed in claim 2, wherein said combination comprises a photographic member and a separate lenticular screen adjacent said member.

8. The system as claimed in claim 1, in which said aperture plate is located in the plane normally occupied by an iris diaphragm.

9. The system as claimed in claim 2, wherein the lenticules of said lenticular screen are defined by square peripheries, and said aperture in said aperture plate has a square periphery.

10. The system as claimed in claim 2, wherein the lenticules of said lenticular screen are defined by hexagonal peripheries, and said aperture in said aperture plate has a hexagonal periphery.

11. The system as claimed in claim 1, wherein said aperture plate includes color filters so that the area of the imagery occupying the format of each lenticule is subdivided into smaller areas corresponding in respect of number and shape to the filters in the aperture plate, thereby causing the gray scale of the associated portions of the imagery formed on the light-sensitive backing means to be modulated according to the amount of light transmitted by the corresponding filters in the aperture plate.

12. The system defined in claim 11, in which the photographic backing means comprises a black-and-white transparency, and which includes a light source positioned to direct light through said lens and color filters to said transparent combination, and which includes a multi-element screen positioned between an observer and the aforesaid transparent combination.

13. The system as claimed in claim 1, wherein the size of the aperture in said aperture plate is adjustable.

* * * * *